Patented Dec. 23, 1947

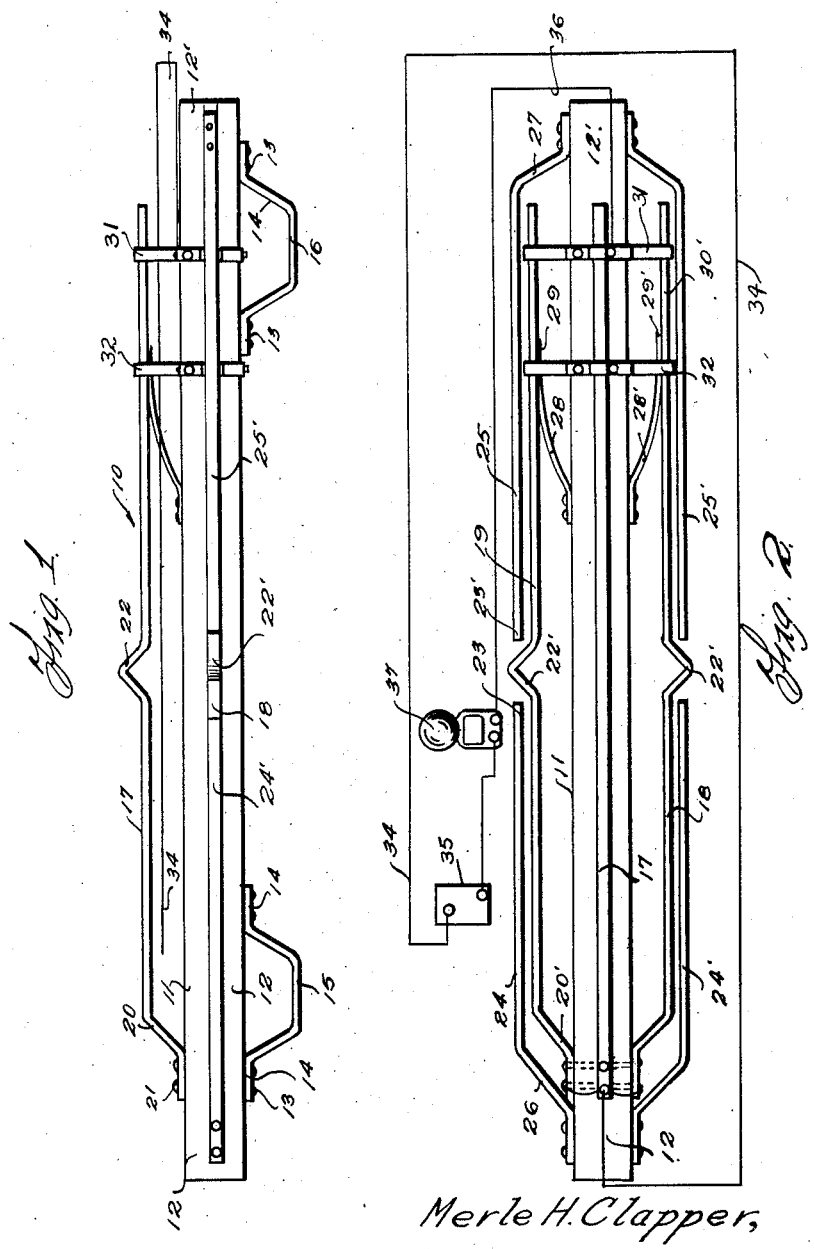

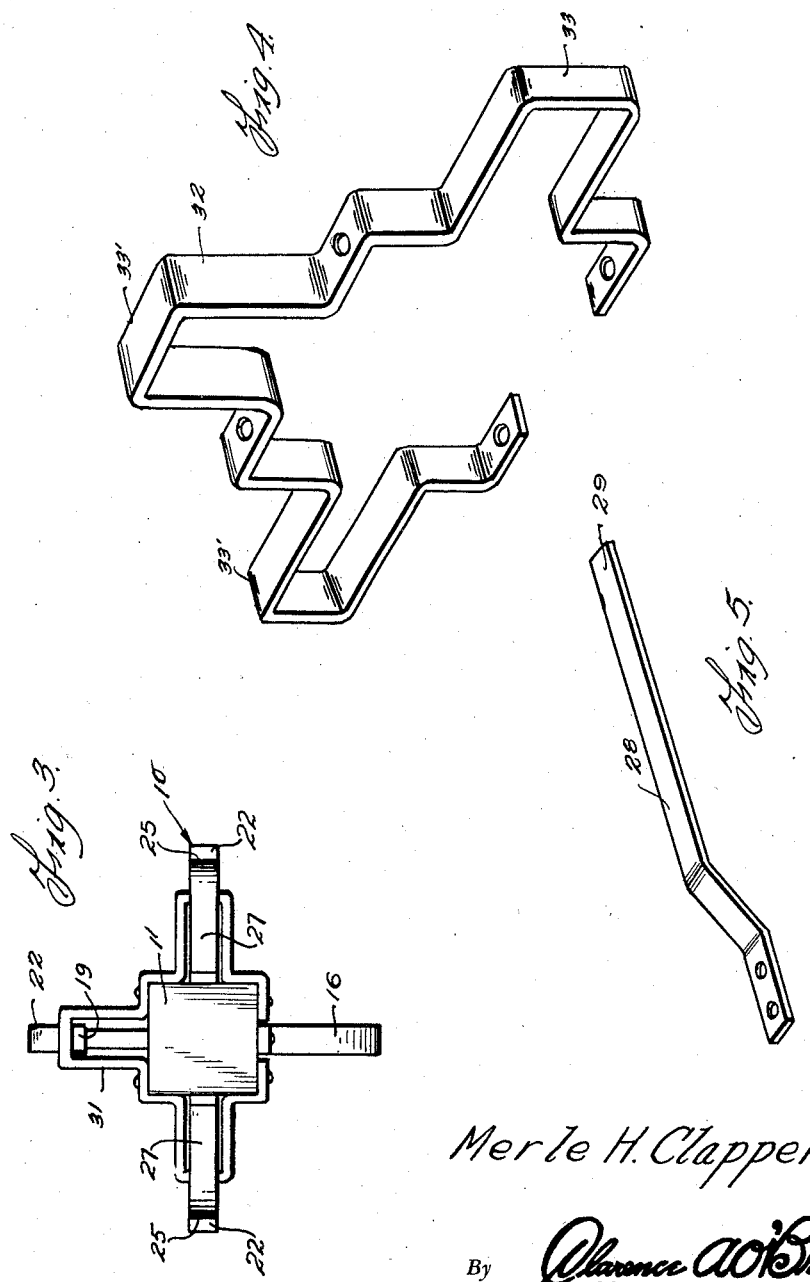

2,433,028

UNITED STATES PATENT OFFICE 2,433,028

SEWER PIPE BRANCH LOCATOR

Merle H. Clapper, Delavan, Wis.

Application January 24, 1945, Serial No. 574,379

1 Claim. (Cl. 200—52)

This invention relates to underground sewers and has for its object to provide means for locating a Y or other branch leading from a main or other line, the position of which is unknown.

Another object of the invention is to provide a Y-locating device which may be moved along inside of an underground pipe-line and which will give an electric alarm when a branch line is reached.

A further object of the invention is to provide a device for operating within a pipeline having a spring actuated feeler adapted to close an electric circuit when a branch line is reached.

Other features and advantages will become more readily apparent from the following description and the accompanying illustrative drawings in which:

Figure 1 is a side elevational view of my locating device,

Figure 2 is a top plan view thereof,

Figure 3 is an end view thereof, certain parts being removed,

Figure 4 is a perspective view of a guide member, and

Figure 5 is a similar view of feeler actuating spring.

In the accompanying drawings as above enumerated and in the following specification, like characters of reference indicate like parts throughout and in which 10, indicates my invention, which embraces an elongated base 11, formed of wood or any non-conducting material. To the ends 12 and 12' of the base is secured by bolt 13, or otherwise, the offset ends 14, of slides 15 and 16, upon which the base is seated and which form spacers to centrally locate the device within a pipeline. Also attached to the end 12 of the base is a series of feelers 17, 18 and 19, which are formed of spring metal and which have offset ends 20 and 20', whereby they are secured to said base by bolts 21. These feelers are of a length somewhat shorter than the base member and are provided centrally with V-crimps 22 and 22', which normally project out between the spaced apart ends 23 and 23' of guards 24 and 25, connected to the ends 12 and 12' at their offset ends 26 and 27.

Secured to the base 11, are leaf springs such as 28 and 28', the free ends 29 and 29' of which bear against the free ends 30 and 30' of the feelers 17, 18 and 19, to normally hold them against the electric contact member 31. Fixed on the base 11, near its end 12' is a feeler guide 32, provided with a series of U-shaped extensions 33 and 33', through which the members 17, 18 and 19 respectively project and whereby they are guided in their movement and confined against displacement. Each of the members 17, 18 and 19, are connected adjacent to their fixed ends to an electric conductor wire 34, extending to one pole a battery 35, and to the contact member 31, is connected a circuit wire 36, leading to an alarm bell 37, which is connected to the other pole of the battery.

In operation, the device is seated in a sewer or other pipeline through a manhole and wherein it is desired to locate a Y or other branch. The device is then pushed along the line by one, or as many as necessary, sectional rods (not shown). The walls of the pipeline acting upon the feeler V's 22, force the feelers against the action of springs 28, out of engagement with the electric contact 31, whereby the electric circuit is broken; however, when a branch in the line is reached, the members 22, being no longer confined the feeler is forced out by spring 28, and into engagement with contact 31, thus closing the circuit and operating the alarm bell, whereupon the situation of the branch may be readily computed by means of said sectional rods.

It is obvious that, should there be a branch on the opposite side from the one to be located, the feeler on that side may be confined against action of spring 28', whereby no alarm will be given until the desired branch is located.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A signalling device for locating a branch in a tubular conduit, said device comprising an elongated body of non-conducting material adapted to be entered into a conduit to be explored, feelers of conducting material supported in spaced parallel relation to the body, a guard overlying each end of each feeler in spaced parallel relation thereto, a V-shaped shoe projecting outwardly from each feeler between adjacent ends of the guards to engage the walls of a conduit being explored and thus to hold the feelers contracted, a spring between each feeler and the body to urge the feelers to expand, and contact means carried by the body and interposed in the path of expansion of the feelers, whereby when a shoe encounters a branch in the conduit being explored its respective feeler will move into contact engaging position to complete a signal circuit.

MERLE H. CLAPPER.

REFERENCES CITED

The following references are of record in the file of this patent:

UNITED STATES PATENTS

| Number | Name | Date |
|---|---|---|
| 1,708,354 | Cabot | Apr. 9, 1929 |
| 1,692,133 | McClave | Nov. 20, 1938 |
| 2,074,753 | McClain | Mar. 23, 1937 |
| 2,267,110 | Kinley | Dec. 23, 1941 |

FOREIGN PATENTS

| Number | Country | Date |
|---|---|---|
| 230,860 | Germany | Feb. 7, 1911 |
| 573,380 | France | Mar. 8, 1924 |